United States Patent

Habrich et al.

[11] Patent Number: 4,715,795
[45] Date of Patent: Dec. 29, 1987

[54] METERING PUMP

[75] Inventors: Reiner Habrich, Kirchheim; Manfred Bauer; Alois Reiter, both of Munich, all of Fed. Rep. of Germany

[73] Assignee: Siemens Aktiengesellschaft, Berlin and Munich, Fed. Rep. of Germany

[21] Appl. No.: 825,143

[22] Filed: Jan. 31, 1986

[30] Foreign Application Priority Data

Feb. 14, 1985 [DE] Fed. Rep. of Germany ....... 8505108

[51] Int. Cl.$^4$ ............................................. F04B 21/02
[52] U.S. Cl. .................................. 417/568; 137/637.2; 417/507
[58] Field of Search ............... 417/454, 507, 508, 510, 417/568; 137/637.2, 596

[56] References Cited

U.S. PATENT DOCUMENTS

| 979,024 | 12/1910 | Moore | 137/637.2 X |
| 2,367,893 | 1/1945 | Sheen | 417/454 |
| 4,211,345 | 7/1980 | Taubenmann . | |

FOREIGN PATENT DOCUMENTS

| 581543 | 8/1959 | Canada | 137/637.2 |
| 60910 | 9/1982 | European Pat. Off. | 137/596 |
| 1163622 | 2/1964 | Fed. Rep. of Germany | 137/637.2 |
| 2432967 | 6/1975 | Fed. Rep. of Germany | 137/637.2 |
| 2851188 | 6/1980 | Fed. Rep. of Germany . | |
| 545071 | 10/1922 | France . | |
| 1233564 | 10/1960 | France | 417/507 |
| 2310479 | 12/1976 | France . | |

Primary Examiner—Leonard E. Smith
Attorney, Agent, or Firm—Hill, Van Santen, Steadman & Simpson

[57] ABSTRACT

In order to enable a conveying from a vacuum into a vacuum when metering liquid components of reaction resin compounds, a metering pump comprising a reciprocating displacement member is employed wherein the intake valve and the discharge valve are fashioned as dish valves controllable from the outside in constrained fashioned including valve stems coaxially seated in the pump head. No noteworthy wear of the valves occurs even when metering liquid components of reaction resin compounds having abrasive fillers.

11 Claims, 2 Drawing Figures

METERING PUMP

BACKGROUND OF THE INVENTION

1. Field of the Invention

The invention relates to a metering pump, particularly for metering liquid components of reaction resin compounds, including a reciprocating displacement member, an intake valve designed as a dish valve and a discharge valve designed as a dish valve.

2. Description of the Prior Art

Reaction resin compounds are produced by mixing precisely prescribed quantities of resin and hardener, whereby a plurality of resins and a plurality of hardeners are employed in many cases. Moreover, additional substances such as fillers, dyestuffs, adhesion promoters, accelerators and the like can also be distributed to the resin and the hardener components. Modern preparation systems for such reaction resin compounds are composed of at least two supply reservoirs for the liquid components or pre-mixtures, metering devices following downstream of the supply reservoirs, and a mixing unit, whereby a static or dynamic flow-through mixer or larger mixing vessels are employed as the mixing unit. Oscillating displacement pumps such as, for example, piston pumps, diaphragm pumps or bellows pumps are, in particular, utilized as metering devices for components containing fillers, whereby rotating displacement pumps such as, for example, gear pumps can be utilized as well for unfilled components. Given the metering pumps having reciprocating displacement members which are employed particularly for metering components containing fillers, both an intake valve as well as a discharge valve are required per displacement member. Automatic valves such as, for example, spring-loaded ball valves, poppet valves or conical valves are thereby usually employed, these, however, being actuated only due to the differences in pressure in the pumping medium generated by the movement of the displacement member (German OS No. 28 51 188). This means, for example, that conveying from a supply reservoir containing a partial or full vacuum can only be reliably carried by means of elevating the hydrostatic pressure or by increasing the pressure elevation in the pumping medium by means of a preliminary pump. Frequently, however, it is necessary to meter the components from a vacuum. For example, when casting electrical high-voltage component parts, the components of an epoxide casting resin compound must be metered from a vacuum of, for example, 0.5 through 100 mbar. Moreover, metering pumps having automatic, spring-loaded valves involve the risk that granular or fibrous impurities will be retained between the valve seat and the movable valve part. This, however, leads to a temporary or permanent malfunctioning of the metering pump since the corresponding valve is held open by the seized impurity and is only partially pumped or not pumped at all.

Metering pumps designed as piston pumps are already known wherein a common intake and discharge valve fashioned as a rotary slide valve is situated in the pump head. Depending upon the position of this rotary slide valve controllable in constrained fashion from the outside, the work chamber in the pump head is then connected either to a supply reservoir or to a discharge pipe (Lueger Lixikon der Technik, Volume 8, 1967, Deutsch Verlags-Anstalt, Stuttgart, pp. 2 and 3). A very precise metering is enabled by such a rotary slide valve, since no changes in the volume in the hydraulic system ensue during the opening and closing events. On the other hand, the rotary slide valve is subject to extremely high wear, particularly when liquid components of reaction resin compounds which contain abrasive fillers are to be metered. Leakiness then arises as a consequence of this wear, a metering of components from a vacuum being impossible from the very outset due to the leakiness.

SUMMARY OF THE INVENTION

An object of the invention is to create a metering pump suitable for metering liquid components of reaction resin compounds and comprising valves controllable in constrained fashion from the outside wherein the valves are not subject to any noteworthy wear and a metering of the liquid components from a vacuum into a vacuum is enabled.

Given a metering pump of the type described in the Field of the Invention portion of this specification, this object is achieved by designing the intake valve and the discharge valve as dish valves controllable from the outside in constrained fashion including valve stems seated in the pump head. The invention is based on the perception that dish valves controllable from the outside in constrained fashion and comprising valve stems coaxially seated in the pump head can operate at least largely wear-free and also enable a reliable seal toward the outside. An impurity seized between a dish valve and valve seat would at most lead to an extremely short-term disturbance since it would either be pinched off during the closing stroke due to the constrained control of the dish valve or would be entrained by the pumping medium after the next opening stroke. In addition to the good seal toward the outside, the coaxial arrangement of the dish valves also enables an extremely compact valve pairing without noticeable changes of the volume in the hydraulic system during the opening and closing events.

A further advantage of the dish valves controllable from the outside in constrained fashion is that the opening stroke can be dimensioned such that the clearance cross-section roughly corresponds to the remaining pipe cross-section and no additional loss of pressure in the flowing medium arises due to the valve clearance. As a consequence of the constrained control of the dish valves, the closing forces can then also be individually set to the respective requirements. Further, it is also possible to synchronously drive the intake valves or the discharge valves of two or more metering pumps via common control lines without a significant influencing of the opening and closing times deriving due to the differing viscosity of the media to be metered. Thus, metering units comprising two or more metering pumps can be unproblematically realized. Finally, the corresponding medium can also be moved back and forth between a supply reservoir and the displacement member by holding the intake valve open and by moving the displacement member, whereby a de-mixing or sedimentation of mixing components can be reliably prevented.

In accord with a preferred development of the invention, the valve stem of the intake valve is seated in the valve disk and the valve stem of the discharge valve is coaxially seated. Such an arrangement of the valve pairing which is adapted to the flow conditions in the work chamber enables an extremely reliable seating and valve guidance of intake valve and discharge valve in the valve block. Moreover, the valve guidance of the intake valve can then be further improved in that an additional guide element for the valve stem of the intake valve is attached to the valve disk of the discharge valve.

The valve stem of the discharge valve is preferably seated in a cover flanged to the pump head. Maintenance work at the metering pump is thereby considerably facilitated, since the valve arrangement composed of intake valve and discharge valve can be disassembled by simply loosening the cover without parting the pipe conduit carrying the medium to be metered.

In accord with a particularly, further development of the invention, it is provided that the outside diameters of the valve stems of intake valve and discharge valve are of identical size at least in those regions flooded by the medium to be metered. Volume changes given a movement of the discharge valve can be completely avoided by means of this measure, ie. two or more metering flows then always remain unaltered in volume relationship.

It has proven for a fast pumping of air bubbles out of the work space when the valve arrangement composed of an intake valve and discharge valve is built into the pump head in a attitude ranging from vertically suspended through horizontally lying. It is particularly beneficial, however, when the valve arrangement composed of intake valve and discharge valve is built into the pump head at an angle of inclination of about 45°. In this case, a sedimentation in the feeder carrying the medium to be metered can be easily avoided, for example by providing an agitator or the like.

For the purpose of a fast, complete pumping of air bubbles out of the work space and, thus, for a simple start-up of the metering pump as well, it is also particularly beneficial when the intake valve is situated in the lower region and the discharge valve is situated in the upper region of the work space in the pump head. Given such an arrangement of the valves, the direction of ascending air bubbles then coincides with the conveying direction of the medium to be metered.

In view of a design of the metering pump which is vacuum-tight toward the outside, it is also expedient when a sealing ring embracing the valve stem of the intake valve is inserted into the discharge valve. In a corresponding fashion, a sealing ring embracing the valve stem of the discharge valve can also be inserted into the cover. A further improvement in the pre-conditions for conveying or, respectively, metering media from supply reservoirs which are under a vacuum or which are pressurized can be achieved, finally, when a fluid sealing agent can be introduced into the bearing gaps between cover and valve stem of the discharge valve and between valve stem of the discharge valve and valve stem of the intake valve.

When the intake valve and the discharge valve are pneumatically or hydraulically actuatable from the outside via double-acting work cylinders situated following one another, then a particularly compact and space-saving design of the overall metering pump unit derives.

BRIEF DESCRIPTION OF THE DRAWINGS

An exemplary embodiment of the invention is shown in the drawing and shall be set forth in greater detail below. Shown are.

DESCRIPTION OF THE PREFERRED EMBODIMENTS

Figure 1:
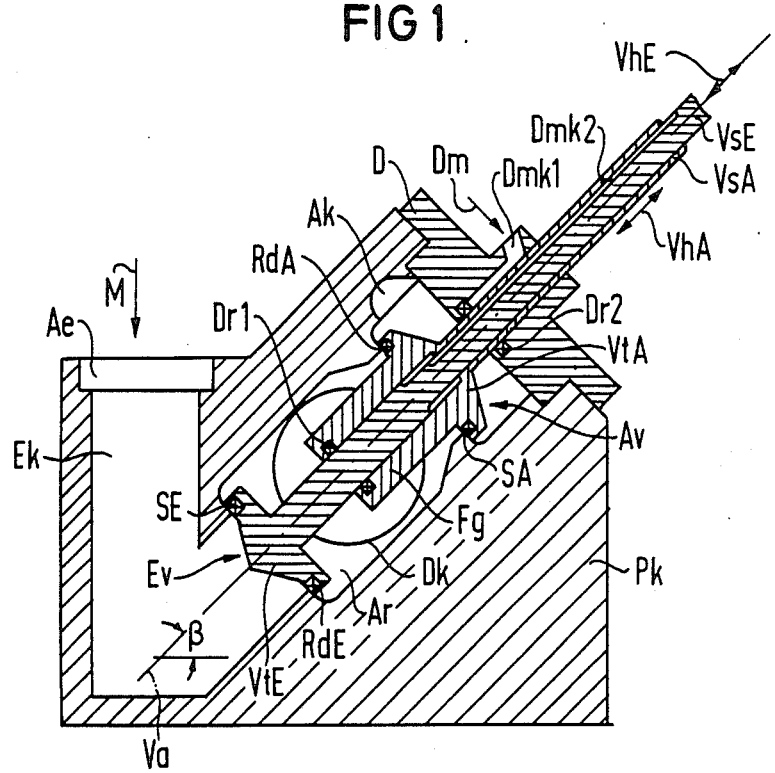
FIG. 1 is a sectional view of the pump head of a metering pump for metering liquid components of reaction resin compounds.

FIG. 1 shows a section through a pump head Pk of a metering pump designed as a piston pump, this pump head Pk being composed, for example, of a rustproof steel. An admission channel Ek is introduced into the pump head Pk, designed block-like, from above in vertical direction, a vertical feeder line (not shown in the drawing) for the medium to be metered (indicated by an arrow M) being connected to an upper connecting end Ae of this admission channel Ek. Proceeding from the floor region of the admission channel Ek, a second, upwardly leading channel branches off obliquely at an angle of inclination of $\beta = 45°$ relative to the horizontal, this second channel forming a working chamber of the metering pump and being closed at its upper end by a cover D flanged on from the outside. Further, the diameter of this second channel is graduated such that, as viewed from the bottom, a seat SE for an intake valve referenced Ev overall is formed first and a seat SA for a discharge valve referenced Av overall is formed at a distance following thereupon.

The horizontally fashioned metering cylinder of the metering pump, this metering cylinder not being shown in detail in FIG. 1, is flanged to the back side of the pump head Pk in the region between the seats SE and SA, whereby the measuring space of the metering cylinder defined by the stroke of a metering piston Dk discharges into a work chamber Ar. The beginning region of a discharge channel Ak can also be seen in the section of FIG. 1 in the region between the seat SA and the cover D, a horizontal outlet line (not shown in the drawing) for the medium M to be metered being connected to the back end of this discharge channel Ak.

The intake valve Ev is fashioned as a dish valve controllable from the outside in constrained fashion and having a valve disk VtE and a valve stem VsE. At that side facing the ground seat SE, the valve disk VtE carries a ring seal RdE let into a groove (not referenced in detail). In order to avoid even the smallest changes in the volume of the hydraulic system of the metering pump, the ring seal RdE is not composed of an elastomer but, rather, is composed of a hard material such as, for example, polytetraflourethylene with carbon as a filler.

The discharge valve Av is likewise fashioned as a dish valve controllable from the outside in constrained fashion, and including a valve disk VtA and a valve stem VsA. At that side facing the ground seat SA, the valve disk VtA carries a ring seal RdA let into a groove (not referenced in detail), this ring seal RdA again being composed of a hard material, such as, for example, polytetrafluorethylene with carbon as filler in view of undesired changes in volume in the hydraulic system. Further, a hollow-cylindrical guide member Fg is applied to the underside of the valve disk VtA, the object of this guide member Fg being set forth in greater detail below with reference to the valve stem guide.

The valve stem guide of the intake valve Ev which is composed, for example, of a rustproof steel, ensues in that its valve stem VsE coaxially penetrates the entire discharge valve Av, ie. the intake valve Ev and the discharge valve Av comprise a common valve axis Va which is directed at the afore-mentioned angle of inclination of $\beta=45°$ relative to the horizontal. The valve stem VsE is first guided in the guide member Fg and is then guided through a region in the hollow-bored valve stem VsA of the discharge valve Av, this region leading to the outside and having a reduced diameter. As a result of this varying design of the valve stem VsE in terms of diameter, those regions of the valve stems VsE and VsA flooded by the medium M to be metered can be fashioned of identical size in terms of outside diameter, so that changes of volume in the hydraulic system are completely avoided given a movement of the discharge valve Av. The valve stem guide of the discharge valve Av, which can likewise be composed of a rust-proof steel, ensues via the valve stem VsA in a guide bore (not referenced in detail) of the cover D.

As a result of the valve stem guides set forth above, the intake valve Ev and the discharge valve Av can be controlled in constrained fashion from the outside via the appertaining valve stems VsE or, respectively, VsA, whereby the corresponding valve strokes are indicated by double arrows VhE and, respectively, VhA.

In order for the metering pump to be able to convey liquid components of reaction resin compounds such as, for example, a resin component or a hardener component, from a vacuum into a vacuum, the working chamber Ar must be sealed extremely well relative to the outside. To this end, the guide member Fg has a sealing ring Dr1 surrounding the valve stem VsE inserted into it, whereas a sealing ring Dr2 surrounding the valve stem VsA is inserted into the cover D. Pressure variable tortionally twisted piston ring packings can, for example, be employed as sealing rings Dr1 and Dr2. Instead of the sealing ring Dr1, however, a spring bellows of polytetrafluorethylene or metal could also be employed for sealing the valve stem VsE.

An additional sealing of the valve stems VsE and VsA from the atmosphere during vacuum operation is enabled by a fluid sealing medium. This sealing medium indicated by an arrow Dm is introduced to the bearing gap between the cover D and the valve shaft VsA, being introduced there into through a first sealant channel Dmk1. A second sealant channel Dmk2 introduced into the valve stem VsE as a longitudinal groove is either filled with sealant Dm during assembly or is charged with the sealant Dm via the first sealant channel DmK1 and a radial bore in the valve stem VsA. When the medium M to be metered is a resin component, pure resin is, for example, employed as the sealant Dm which should also simultaneously act as lubricant. Castor oil is also suitable as sealant Dm for metering liquid components of epoxide resin compounds, since the castor oil is unproblematically incorporated into the epoxide resin given slight leaks which may potentially occur.

Figure 2:
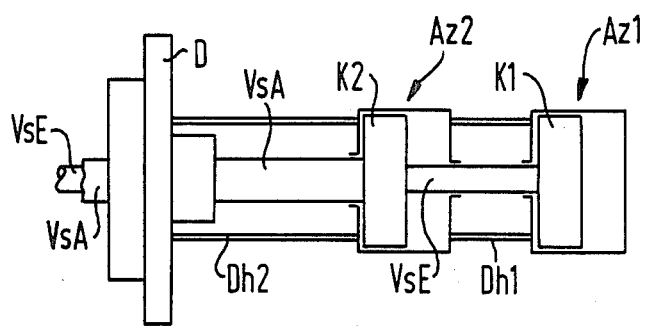
FIG. 2 is a schematic sectional view of a tandem arrangement of two work cylinders for the actuation of the valves situated in the pump head according to FIG. 1.

In accord with FIG. 2, the actuation of the valves ensues pneumatically or hydraulically via double-acting work cylinders Az1 and Az2 situated following one another, whereby a piston K1 of the first work cylinder Az1 is secured to the valve stem VsE of the intake valve Ev (cf. FIG. 1), and whereby a piston K2 of the second work cylinder Az2 is secured to the valve stem VsA of the discharge valve Av (cf. FIG. 1). It may also be seen from the greatly simplified, schematic illustration that the working cylinder Az1 is connected to the second working cylinder Az2 via spacers Dh1 and that the second working cylinder Az2 is in turn secured to the cover D via spacers Dh2.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. As metering pump including a pump head, particularly for metering liquid components of reaction resin compounds comprising:
    a reciprocating displacement member;
    an intake valve designed as a dish valve;
    a discharge valve designed as a dish valve,
        actuation elements arranged outside of said pump head to control said intake valve and said discharge valve, said valves having valve stems coaxially seated in the pump head which are actuated by said actuation elements,
    said valve stem of said intake valve being coaxially seated in a valve disk and said valve stem of said discharge valve, and
    an additional guide member for said valve stem of said intake valve being attached to said valve disk of said discharge valve.

2. A metering pump according to claim 1, wherein a sealing ring surrounding said valve stem of said intake valve is inserted into said discharge valve.

3. A metering pump including a pump head, particularly for metering liquid components of reaction resin compounds comprising:
    a reciprocating displacement member;
    an intake valve designed as a dish valve;
    a discharge valve designed as a dish valve,
    said valve stem of said discharge valve is seated in a cover flanged to said pump head
        actuation elements arranged outside of said pump head to control said intake valve and said discharge valve, said valves having valve stems coaxially seated in the pump head which are actuated by said actuation elements.

4. A metering pump according to claim 3, wherein the outside diameters of said valve stems of said intake valve and said discharge valve are of identical size at least in those regions flooded by the medium to be metered.

5. A metering pump according to claim 3, wherein said intake valve is situated in the lower region and said discharge valve is situated in the upper region of a work chamber in said pump head.

6. A metering pump according to claim 3, wherein a sealing ring surrounding said valve stem of said discharge valve is inserted into said cover.

7. A metering pump according to claim 3, wherein a fluid sealant is introducable into the bearing gaps between said cover and said valve stem of said discharge valve and between said valve stem of said discharge valve and said valve stem of said intake valve.

8. A metering pump according to claim 3, wherein said valve stem of said intake valve is coaxially seated in a valve disk and said valve stem of said discharge valve.

9. A metering pump according to claim 3, wherein said intake valve and said discharge valve are actuatable from the outside via double-acting working cylinders situated following one another.

10. A metering pump according to claim 3, wherein the valve arrangement composed of said intake valve and said discharge valve is incorporated into said pump head in an attitude ranging from vertically suspended to horizontally lying.

11. A metering pump according to claim 10, wherein said valve arrangement composed of said intake valve and said discharge valve is incorporated into said pump head at an angle of inclination of about 45°.

* * * * *